3,520,437
**INTEGRAL SEAL STRUCTURE FOR
NON-METALLIC RESERVOIR**
Joseph R. Fleming and Thomas M. Fleming, Prairie Village, Kans., assignors to T. J. Fleming Company, Kansas City, Kans., a corporation of Missouri
Filed Mar. 18, 1969, Ser. No. 808,283
Int. Cl. B65d *11/02, 25/04*
U.S. Cl. 220—5                                2 Claims

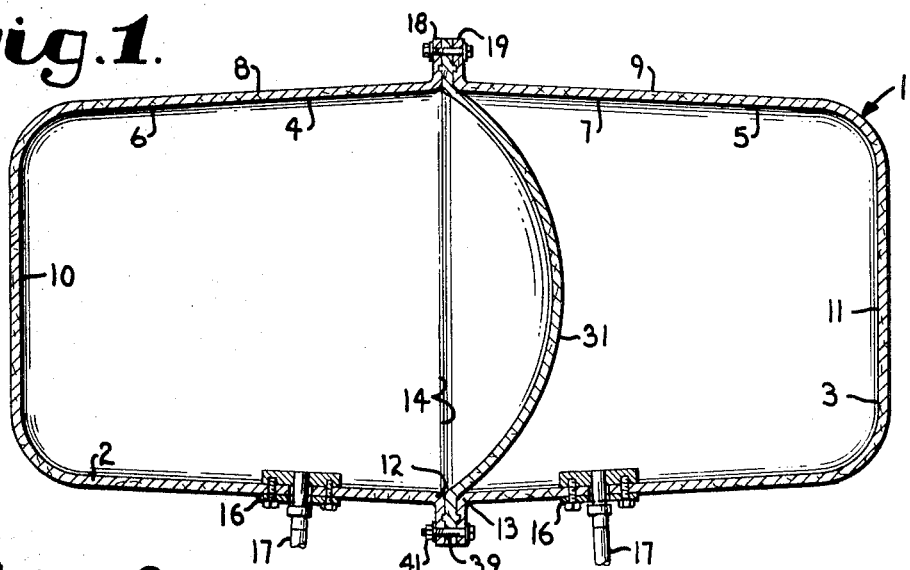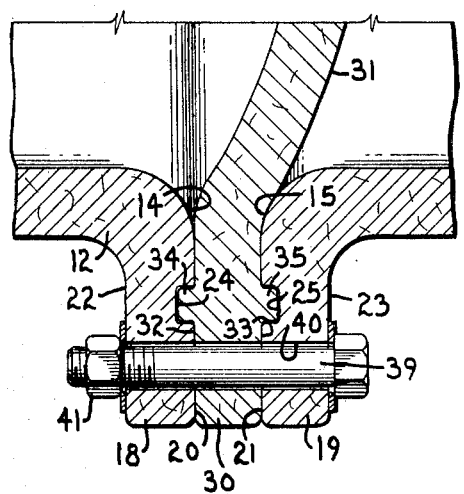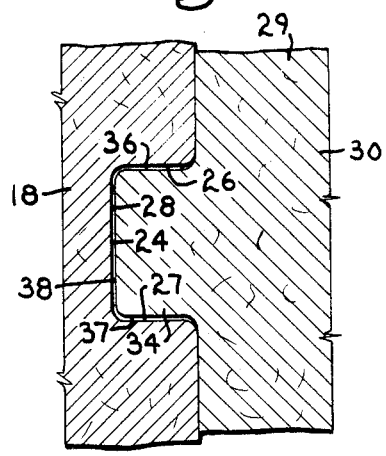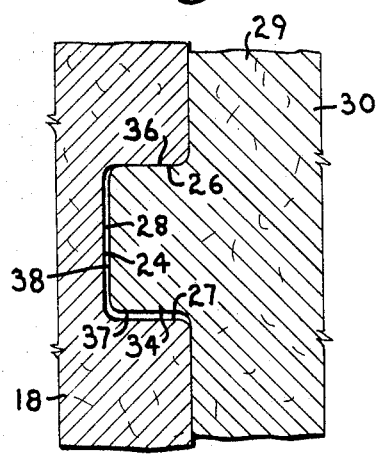

ABSTRACT OF THE DISCLOSURE

A double chamber compressed air reservoir of the railroad air-brake type includes a non-metallic center separating member having a radial flange sandwiched between the radial flanges of opposed non-metallic tank members. An axially directed annular projection on each face of the separating member flange is received into annular grooves on the flanges of the tank members. Fluid pressure in the tank chambers causes slight elastic expansion of the tank member flanges which urges walls of the projections and grooves together.

---

This invention relates to compressed fluid reservoirs and more particularly to a seal structure for double chamber reservoirs of the railroad air-brake type.

The vast majority of compressed fluid vessels are of welded, riveted or bolted metal construction, although pressure vessels constructed of non-metallic materials, such as synthetic resin impregnated fiber glass, are not unknown. Such non-metallic vessels having a double chamber have been suggested for use in railroad air-brake mechanisms, however, heretofore these structures have required either separate seals in the form of resilient O-rings or gaskets, or adhesives to secure overlapping portions together on a permanent basis (see U.S. Pat. No. 3,380,002). Since severe environmental conditions produce the need for frequent safety inspections, the replacement of seals involves a considerable expense while the adhesively secured tanks are difficult to inspect because of limited interior access.

The principal objects of the present invention are: to provide a double chamber compressed fluid reservoir of non-metallic material which may be easily assembled and disassembled without the use of separate gaskets or seals; to provide such a structure wherein the introduction of fluid under pressure produces the movement of flange parts into sealing contact with each other; to provide such a tank structure which is simple in design and relatively inexpensive to manufacture; and to provide such a compressed fluid reservoir which is light in weight and yet exhibits long life under severe conditions of use.

Other objects and advantages of this invention will become apparent from the following description taken in connection with the accompanying drawings wherein are set forth by way of illustration and example certain embodiments of this invention.

FIG. 1 is a cross sectional side elevation through a double chamber compressed fluid reservoir embodying this invention.

FIG. 2 is a fragmentary cross sectional view through the reservoir on an enlarged scale particularly showing the assembled joint structure between opposed tank members and a central separation member.

FIG. 3 is a fragmentary cross sectional view through the reservoir on a further enlarged scale showing details of the projection and groove seal arrangement.

FIG. 4 is a view similar to FIG. 3 but showing the parts repositioned due to the containment of fluid under normal working pressure.

Referring to the drawings in more detail:

The reference numeral 1 generally indicates a double chamber compressed fluid reservoir incorporating a seal structure embodying this invention. The reservoir 1 comprises first and second tank members respectively designated 2 and 3 produced from a suitable non-metallic material, such as fiber glass rovings or chopped strands preformed on a screen using a binder and then impregnated with a clear or pigmented polyester resin. It is contemplated that matched dyes and high pressure press equipment adapted to cure the polyester resin under heat are most desirable for rapid production.

The members 2 and 3 respectively have generally cylindrical side walls 4 and 5 with inside surfaces 6 and 7, outside surfaces 8 and 9 and integral end walls 10 and 11. The members 2 and 3 also include cylindrical rim portions 12 and 13 defining open ends 14 and 15 opposed to the respective end walls 10 and 11. Suitable nipple securing structures 16 are mounted on the side walls 4 and 5 to provide access into the tank members 2 and 3 and to permit securing conventional pressure hoses 17 thereto.

The rim portions 12 and 13 each include integral radially outwardly directed, annular flanges 18 and 19 surrounding the respective open ends 14 and 15. The tank member flanges 18 and 19 are axially aligned and have front circular faces 20 and 21 directed toward each other and rear circular faces 22 and 23 directed away from each other. The front faces 20 and 21, in this example, respectively have an annular groove 24 and 25 extending thereinto and surrounding the open ends 14 and 15. The annular grooves 24 and 25 each have an inside, axially extending wall 26, an outside, axially extending wall 27 spaced radially from the wall 26 and a bottom radially extending wall 28 connecting the walls 26 and 27.

A relatively rigid separation member 29, preferably of the same material and formed in the same way as the members 2 and 3 comprises an annulus or radial flange 30 integral with a dome-shaped interior wall 31. The flange 30 has oppositely directed, spaced apart circular faces 32 and 33 and separates the interiors of the tank members 2 and 3 when located between and aligned with the tank member faces 20 and 21.

Each of the flange faces 32 and 33 has an integral, annular projection 34 and 35 corresponding to the respective annular grooves 24 and 25. The annular projections 34 and 35 each have an inside axially extending wall 36, and outside axially extending wall 37 and a radial top wall 38 extending therebetween. The dimensions and diameters of the respective projections 34 and 35 and grooves 24 and 25 are such that the projections are receivable within the respective grooves with slight clearance at both the inside, outside and top walls when the surfaces of faces 32 and 33 are in contact with the circular faces 20 and 21 of the tank members 2 and 3, FIG. 3. This relationship, in addition to the advantage discussed below, helps align the respective tank members 2 and 3 and separation member 29 and permits easy assembly.

The tank members 2 and 3 and separation member 29 are maintained in coaxial assembled relation by means of suitable bolts 39 extending through aligned, axially directed, circumferentially spaced bores 40 in the respective members and secured by means of suitable nuts 41. In assembly, the tank members 2 and 3 are drawn together tightly, but with insufficient force to prevent a slight sliding motion between the tank member flanges 18 and 19 and the separation member flange 30 under working tank pressure.

The groove inside walls 26 and projection inside walls 36 are spaced apart a controlled distance whereupon working pressure within the tank members 2 and 3 causes sufficient strain or expansion of the flanges 18 and 19 with respect to the separation member flange 30 so that the respective walls 26 and 36 are forced together in sealing relation.

With the above noted arrangement, it has been found that relatively low modulus materials, such as the resin impregnated fiber glass noted, will produce lightweight, double chamber reservoirs which may be conveniently assembled and sealed without the need for separate gaskets, O-rings or the like.

It is to be understood that this invention is not to be limited to the particular form herein described and illustrated.

What we claim and desire to secure by Letters Patent is:

1. A double chamber compressed fluid reservoir comprising:
   (a) first and second tank members each having generally cylindrical side walls terminating in an annular flange surrounding facing open tank ends,
   (b) said tank member flanges having front circular faces directed toward each other and an annular groove extending thereinto and surrounding said open ends, said annular grooves each having an inside, axially extending wall,
   (c) a separation member having a wall separating the interiors of said tank members and an annular flange, said separation member flange being located between said tank member flanges and having opposed circular faces facing said respective front faces, said last named faces each having an integral annular projection aligned with and received into said respective annular grooves,
   (d) said annular projections each having an inside, axially extending wall, the dimensional relationship between said grooves and projections being such that working pressure in said reservoir urges said projection inside walls against said groove inside walls.

2. The structure as set forth in claim 1 wherein:
   (a) said tank members are composed of synthetic resin impregnated fiber glass.

References Cited
UNITED STATES PATENTS 550,094 11/1895 Blundell _____ 220—5
3,095,993 7/1963 Balcom.

GEORGE E. LOWRANCE, Primary Examiner

U.S. Cl. X.R.
220—22